Aug. 28, 1934.  G. R. WEAR  1,971,435
FILM HOLDING ATTACHMENT FOR CAMERAS
Filed Sept. 21, 1933  4 Sheets-Sheet 1
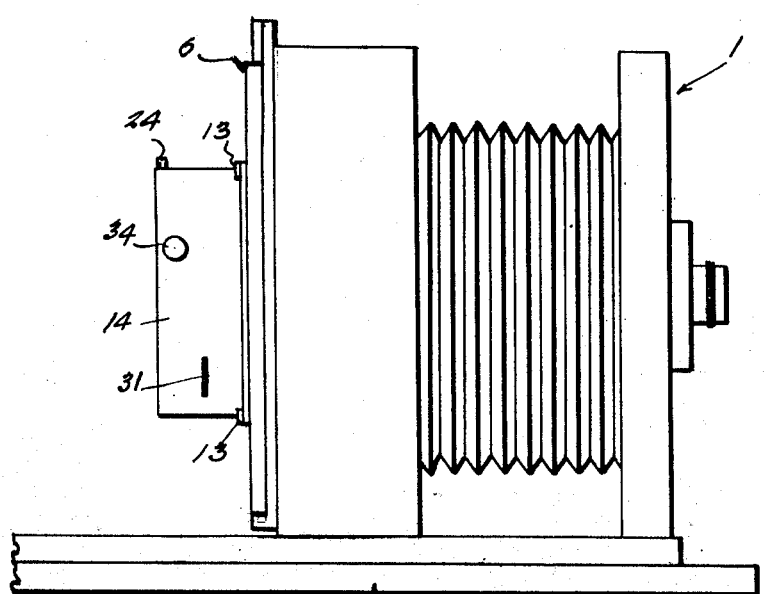
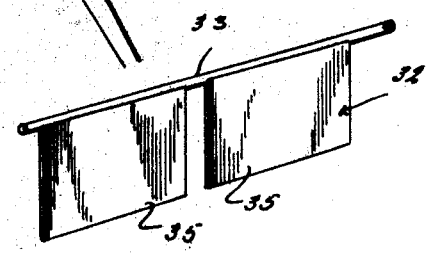
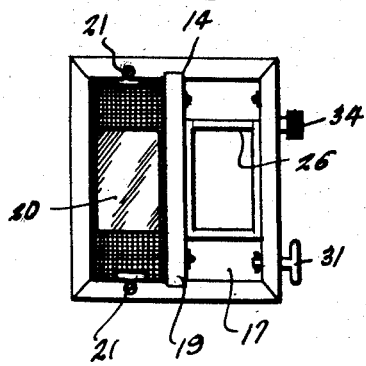
Inventor
George R. Wear
By *Clarence A. O'Brien*
Attorney Aug. 28, 1934.　　　　　G. R. WEAR　　　　　1,971,435
FILM HOLDING ATTACHMENT FOR CAMERAS
Filed Sept. 21, 1933　　　4 Sheets-Sheet 2
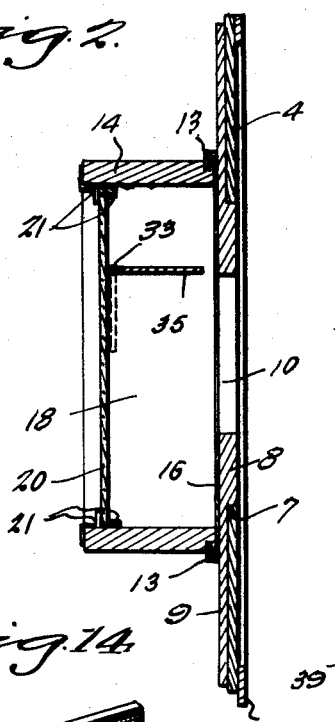
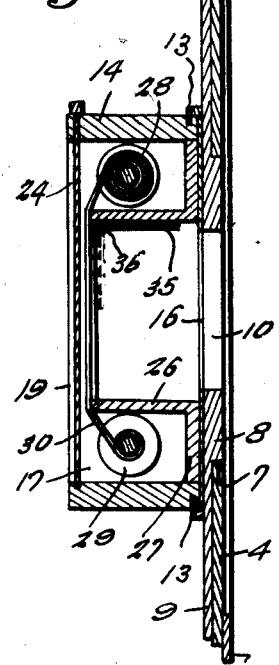
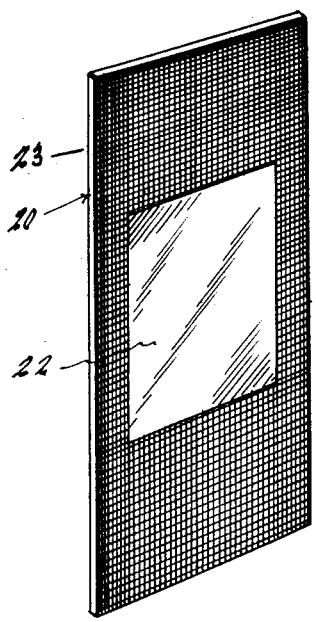
Inventor
George R. Wear
By Clarence A. O'Brien
Attorney Aug. 28, 1934.    G. R. WEAR    1,971,435
FILM HOLDING ATTACHMENT FOR CAMERAS
Filed Sept. 21, 1933    4 Sheets-Sheet 3

Inventor
George R. Wear
By Clarence A. O'Brien
Attorney

Aug. 28, 1934.  G. R. WEAR  1,971,435
FILM HOLDING ATTACHMENT FOR CAMERAS
Filed Sept. 21, 1933  4 Sheets-Sheet 4
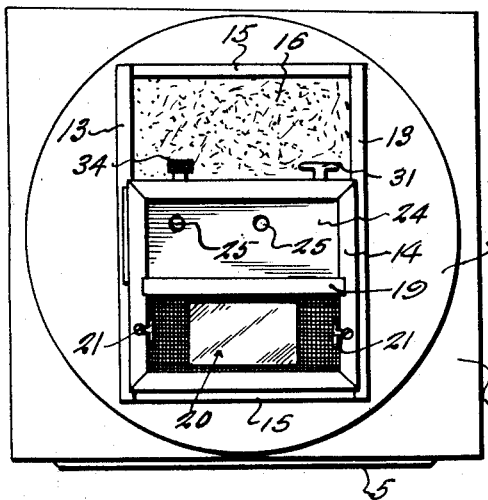
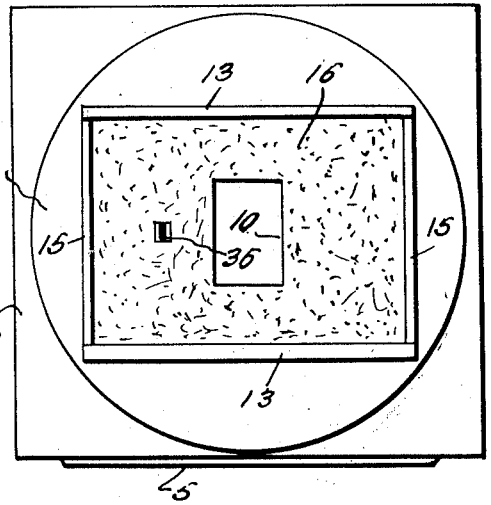
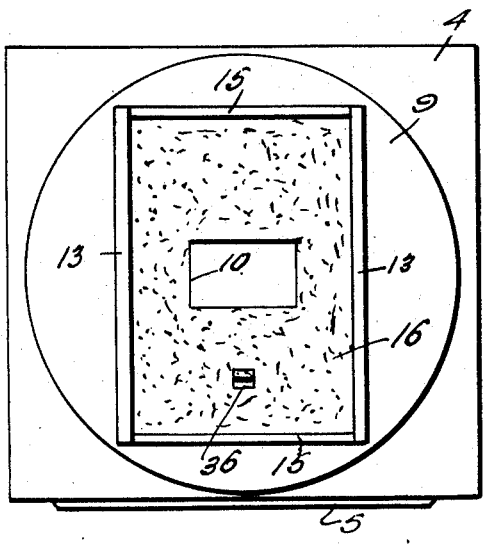
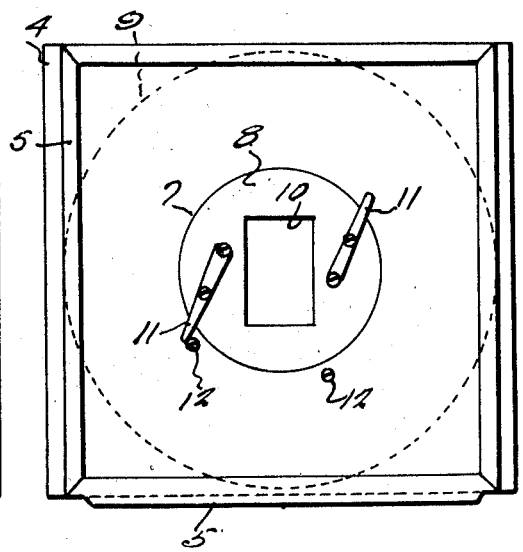
Inventor
George R. Wear.
By *Clarence A. O'Brien*
Attorney Patented Aug. 28, 1934

1,971,435

UNITED STATES PATENT OFFICE

1,971,435

FILM HOLDING ATTACHMENT FOR CAMERAS

George R. Wear, Sherman, Tex.

Application September 21, 1933, Serial No. 690,448

2 Claims. (Cl. 95—36)

The present invention relates to an attachment for cameras, particularly studio or portrait cameras, and has for its primary object to provide, in a manner as hereinafter set forth, an attachment embodying a novel construction, combination and arrangement of parts through the medium of which the usual spool films may be used in studio or portrait cameras in lieu of the plates or flat films now in general use.

Another very important object of the invention is to provide an attachment of the aforementioned character for cameras embodying a construction which is such that the photographs may be made either vertically or transversely on the film and further including means by which two sizes of photographs may be made on the same film.

Other objects of the invention are to provide a camera attachment of the character described which will be simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a studio or portrait camera with an attachment constructed in accordance with the present invention mounted thereon.

Figure 2 is a vertical sectional view through the attachment, taken substantially on the line 2—2 of Figure 4.

Figure 3 is a vertical sectional view through the attachment, taken substantially on the line 3—3 of Figure 4.

Figure 8 is a rear elevational view, showing the attachment in position for making a horizontal exposure.

Figure 9 is a rear elevational view of the attachment with the slidable housing removed.

Figure 10 is a view similar to Figure 9, but with the rotary supporting structure in position for making a horizontal exposure.

Figure 11 is a view in front elevation of the invention.

Figure 12 is a detail view in perspective of the shutters.

Figure 13 is a detail view in rear elevation of the slidable housing.

Figure 14 is a detail view in perspective of the ground glass.

Figure 15 is a plan view of a portion of a strip of film.

Figure 4:
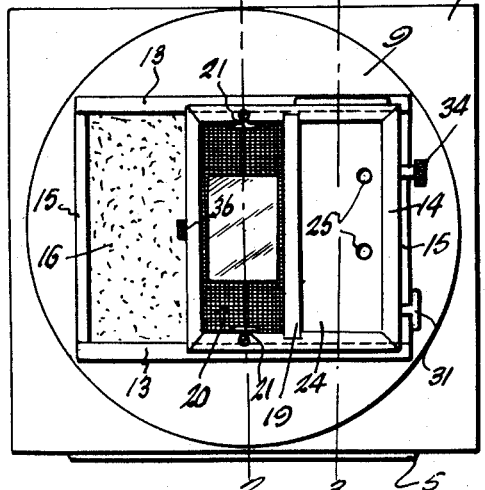
Figure 4 is a view in rear elevation, showing the attachment adjusted for focusing.

Referring now to the drawings in detail, it will be seen that the reference numeral 1 designates generally a conventional studio or portrait camera upon the back of which the attachment constituting the present invention is mounted, said camera including the usual base 2 mounted on the supporting legs 3. The embodiment of the present invention which has been illustrated comprises a substantially square plate 4 of suitable material having secured in any desired manner on its forward side a frame 5. The frame 5 projects below the plate 4 for engagement in the usual groove or channel provided in the lower portion of the back of the camera 1 for the reception of flat films or plates. The top of the attachment constituting the present invention is secured to the back of the camera 1 by a resilient latch 6.

The plate 4 has formed therein a centrally located, circular opening 7 which rotatably receives the forwardly projecting, circular hub portion 8 of a disk 9 which is rotatably mounted on the back of said plate 4. The disk 9 has formed therein a centrally located window 10. As illustrated to advantage in Figure 11 of the drawings, the disk 9 is rotatably secured on the plate 4 through the medium of tangentially extending arms 11 which are mounted on the forward end of the hub 8 and which extend therefrom over the plate 4. Stops 12 are provided on the forward side of the plate 4 for engagement with the arms 11 for limiting rotation of the disk 9 to one quarter of a revolution in either direction.

Mounted on the rear side of the disk 9, on opposite sides of the window 10, are opposed parallel guides 13 in which a substantially rectangular housing 14 is slidable. Stops 15 extend between the ends of the guides 13 for preventing detachment of the housing 14. A lining 16 of felt or other suitable material is provided on the disk 9.

The housing 14 is divided into what will be hereinafter referred to as film and focusing compartments 17 and 18, respectively, by a partition 19. The focusing compartment 18 is closed at its rear by a ground glass 20 which is secured in position by suitable means, as at 21. As best seen in Figure 14 of the drawings, the glass 20 includes a substantially translucent or transparent central area 22 and an opaque border 23.

The film compartment 17 is closed, at its rear, by a slidable closure 24 having windows 25 therein. Mounted in the film compartment 17 of the housing 14 is a substantially rectangular frame 26 which is open at its front and rear and which includes oppositely extending attaching flanges 27. Journaled in the film compartment 17 above and below the frame 26 are spools 28 and 29, respectively, for the film 30. The film 30 is trained over the rear end of the frame 26 and is wound on the spool 29 from the spool 28, as will be apparent. Suitable means, as at 31, is provided on the housing 14 for manually actuating the spool 29.

The reference numeral 32 designates generally a shutter unit which is mounted in the housing 14. The unit 32 includes a shaft 33 which extends through the compartments 17 and 18 and which traverses the frame 26. The shaft 33 is rotatable and has fixed on an outwardly projecting end portion an actuating knob or head 34. Fixed on the shaft 33 for operation in the frame 26 and in the compartment 18 are shutter plates 35. The plates 35 are adapted to be swung from inoperative position, as shown in Figures 2 and 3 of the drawings, to operative position, as suggested in broken lines in said Figures 2 and 3. Any suitable means may be provided, if desirable or necessary, for retaining the shutter unit 32 in operative or inoperative position. The reference numeral 36 designates a suitable latch which is mounted on the disk 9 for releasably securing the housing 14 in focusing position. In Figure 15 of the drawings a portion of a strip of film is shown with picture areas defined thereon.

Briefly, the operation of the attachment is as follows: The compartment 17 is loaded and closure 24 is slid to closed position. The housing 14 is then shifted to the position shown in Figure 4 of the drawings in which position the area 22 of the glass 20 is alined with the window 10 in the disk 9 and the lens of the camera 1. This permits the camera to be properly focused after which the housing 14 is shifted to the position shown in Figure 5 of the drawings to position the film 30 in alinement with the window 10. The camera is then ready for the exposure.

Figure 5:
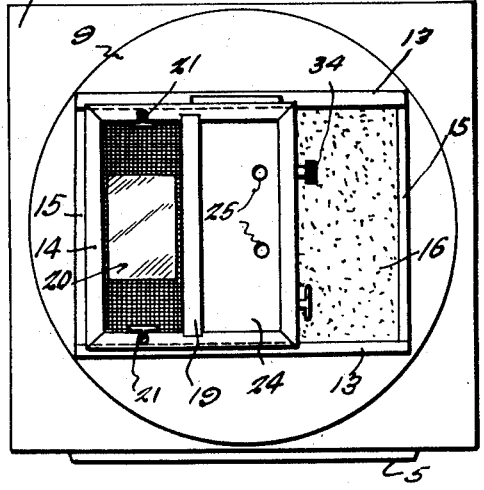
Figure 5 is a rear elevational view, showing the device in position for an exposure.
Figure 6:
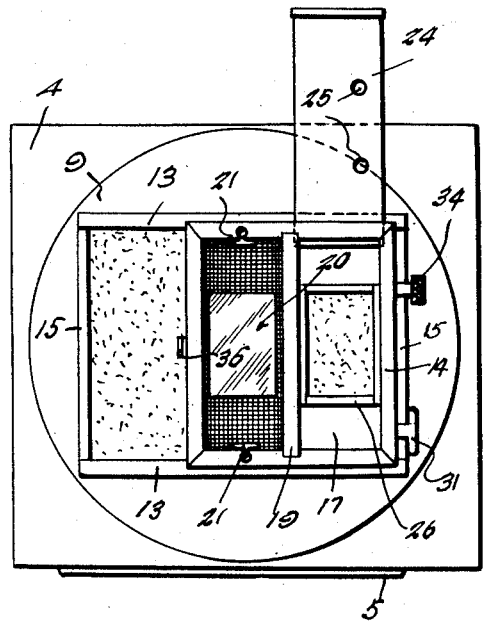
Figure 6 is a rear elevational view of the attachment, showing the slidable closure in open position to permit loading.
Figure 7:
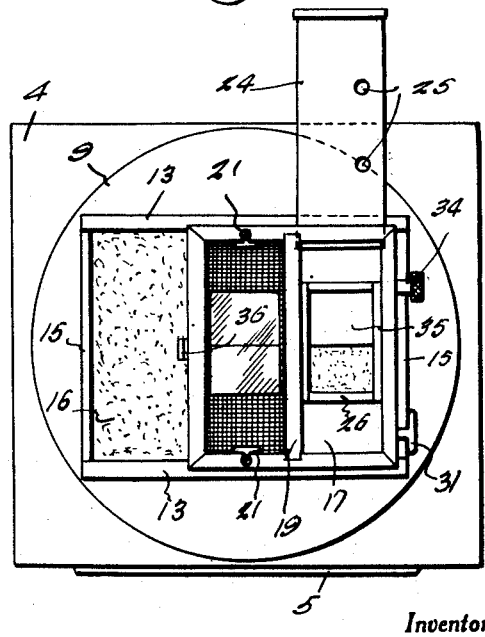
Figure 7 is a rear elevational view, showing the slidable closure in open position and the shutters in lowered or operative position.

With the attachment in the position shown in Figure 5 of the drawings, a single vertical picture will be made on the exposed portion of the film 30 and the top of said picture will be located as indicated at 38 in Figure 15 of the drawings. When the attachment is turned to the position shown in Figure 8 of the drawings, the top of the picture will be as indicated at 39 in Figure 15. Should it be desired to make two pictures on an area of the film which is ordinarily used for but one picture, the shutter plates 35 are swung downwardly to operative position prior to the focusing operation. The shutter plate 35 which is in the frame 26 shields or masks substantially one-half of the area of the film that would otherwise be exposed.

It is believed that the many advantages of a camera attachment constructed in accordance with the present invention will be readily understood, particularly by those skilled in the art, and although the preferred embodiment of the invention is as illustrated and described, it is to be understood that changes in the details of construction and in the combination and arrangement of parts may be resorted to which will fall within the scope of the invention as claimed.

What is claimed is:

1. A camera attachment comprising a plate mounted on the back of the camera, a disk rotatably mounted on the plate, said disk having a window therein, a housing slidably mounted on the disk, said housing having film and focusing compartments therein adapted to be brought selectively into alinement with the window, a frame mounted in the film compartment, said frame open at its front and rear, spools operatively mounted in the film compartment for drawing a strip of film across the rear of the frame, a closure for the rear of the film compartment, a ground glass mounted in the focusing compartment, and shutter plates mounted for swinging movement to operative or inoperative positions in the compartments, one of the shutter plates being operable in the frame for shielding a portion of the film from the window.

2. A camera attachment comprising a plate, means for mounting the plate on the rear of the camera, said plate having an opening therein, a disk mounted on the plate, said disk including a hub portion rotatably engaged in the opening in the plate, the disk having a centrally located window therein, a housing slidably mounted on the disk, said housing having film and focusing compartments therein, said film and focusing compartments adapted to be brought selectively into alinement with the window, a frame in the film compartment open at its front and rear, spools rotatably mounted in the film compartment for drawing the film across the rear of the frame, a slidable closure for the rear of the film compartment, a ground glass mounted in the focusing compartment, a shaft journaled in the housing and extending across the compartments, said shaft traversing the frame, means for actuating the shaft, and shutters fixed on the shaft for swinging movement to operative or inoperative position in the frame and in the focusing compartment.

GEORGE R. WEAR.